US009496908B1

(12) United States Patent
Van Fleteren

(10) Patent No.: US 9,496,908 B1
(45) Date of Patent: Nov. 15, 2016

(54) SUPERHETERODYNE RECEIVER WITH IMPROVED IMMUNITY TO SPURIOUS NOISE INTERFERENCE

(71) Applicant: General Dynamics Mission Systems, Inc., Fairfax, VA (US)

(72) Inventor: Stephan R. Van Fleteren, San Carlos, CA (US)

(73) Assignee: General Dynamics MIssion Systems, Inc., Fairfax, VA (US)

( * ) Notice: Subject to any disclaimer, the term of this patent is extended or adjusted under 35 U.S.C. 154(b) by 0 days.

(21) Appl. No.: 15/096,438

(22) Filed: Apr. 12, 2016

(51) Int. Cl.
*H04B 1/00* (2006.01)
*H04B 1/26* (2006.01)
*H04B 1/14* (2006.01)
*H04B 1/10* (2006.01)

(52) U.S. Cl.
CPC .............. *H04B 1/26* (2013.01); *H04B 1/1081* (2013.01); *H04B 1/14* (2013.01)

(58) Field of Classification Search
CPC ......... H04B 1/26; H04B 1/14; H04B 1/1081
See application file for complete search history.

(56) References Cited

U.S. PATENT DOCUMENTS

| 9,190,975 B2* | 11/2015 | Kasha | H03G 3/3052 |
| 2013/0028352 A1* | 1/2013 | Leenaerts | H03D 7/163 375/316 |
| 2014/0080433 A1* | 3/2014 | He | H04B 1/005 455/209 |

\* cited by examiner

*Primary Examiner* — Dac Ha
(74) *Attorney, Agent, or Firm* — Lorenz & Kopf, LLP (LKGlobal)

(57) ABSTRACT

A super-heterodyne receiver includes a plurality of input filters configured to receive an input signal and divide up a tuning range of the input signal into a plurality of respective bands, wherein the input filters are divided into a plurality of filter sets, each having a respective filter set output, and each of the input filters has a center frequency and a bandwidth. The receiver further includes a first amplifier having an input coupled to a first filter set output and an output coupled to a first mixer; a second amplifier having an input coupled to a second filter set output and an output coupled to a second mixer. The first filter set comprises a first plurality of input filters having respective center frequencies ranging from approximately 1250 MHz to 6250 MHz, a second plurality of input filters having respective center frequencies ranging from approximately 8250 MHz to 18500 MHz, and a third plurality of center frequencies ranging from approximately 24000 MHz to 38000 MHz. The first filter has a center frequency of approximately 8000 MHz, the second filter has a center frequency of approximately 3500 MHz, and the first oscillator is adjustable between approximately 8250 MHz and 23000 MHz.

20 Claims, 2 Drawing Sheets

SUPERHETERODYNE RECEIVER WITH IMPROVED IMMUNITY TO SPURIOUS NOISE INTERFERENCE

TECHNICAL FIELD

Embodiments of the subject matter described herein relate generally to heterodyne receivers and, more particularly, to superheterodyne receivers with improved immunity to spurious noise interference.

BACKGROUND

Superheterodyne receivers (also referred to herein as "super-het" receivers) are advantageously used in a variety of contexts, such as radio communication, since such receivers employ frequency mixing to convert a received signal (e.g., from an antenna) to a fixed intermediate frequency (IF) that can be more conveniently processed than the original carrier frequency of the received signal.

While super-het receivers are widely popular and offer many advantages, known super-het receivers are unsatisfactory in a number of respects. For example, such receivers are subject to various categories of noise, such as spurious noise outside the detection bandwidth of the receiver. As used herein, the phrase "spurious noise" refers to any signal energy that is not the signal of interest. Examples of such noise are limitless and cover the entire electromagnetic spectrum, ranging from natural sources such as radio waves from space to man-made sources such as microwave ovens or airport radars. Such external sources of noise, regardless of their source or frequency (outside the final detection bandwidth), should not impair the final fidelity of the detection of the signal of interest. Prior art attempts to design super-het receivers that are immune or substantially immune to spurious noise have largely been unsuccessful as they do not employ an optimum combination of filters, mixers, and oscillators (such as local oscillators).

Accordingly, methods and systems are desired for superheterodyne receivers with improved spurious noise immunity.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to an improved super-het receiver architecture that blocks all or nearly all spurious noise outside the detection bandwidth of the receiver input. In accordance with one embodiment, for example, the receiver employs sets of filters with particularly advantageous center frequencies and bandwidths that divide up the input tuning range for processing by a collection of mixers, local oscillators, and synthesizers used for course and fine tuning.

Figure 1:
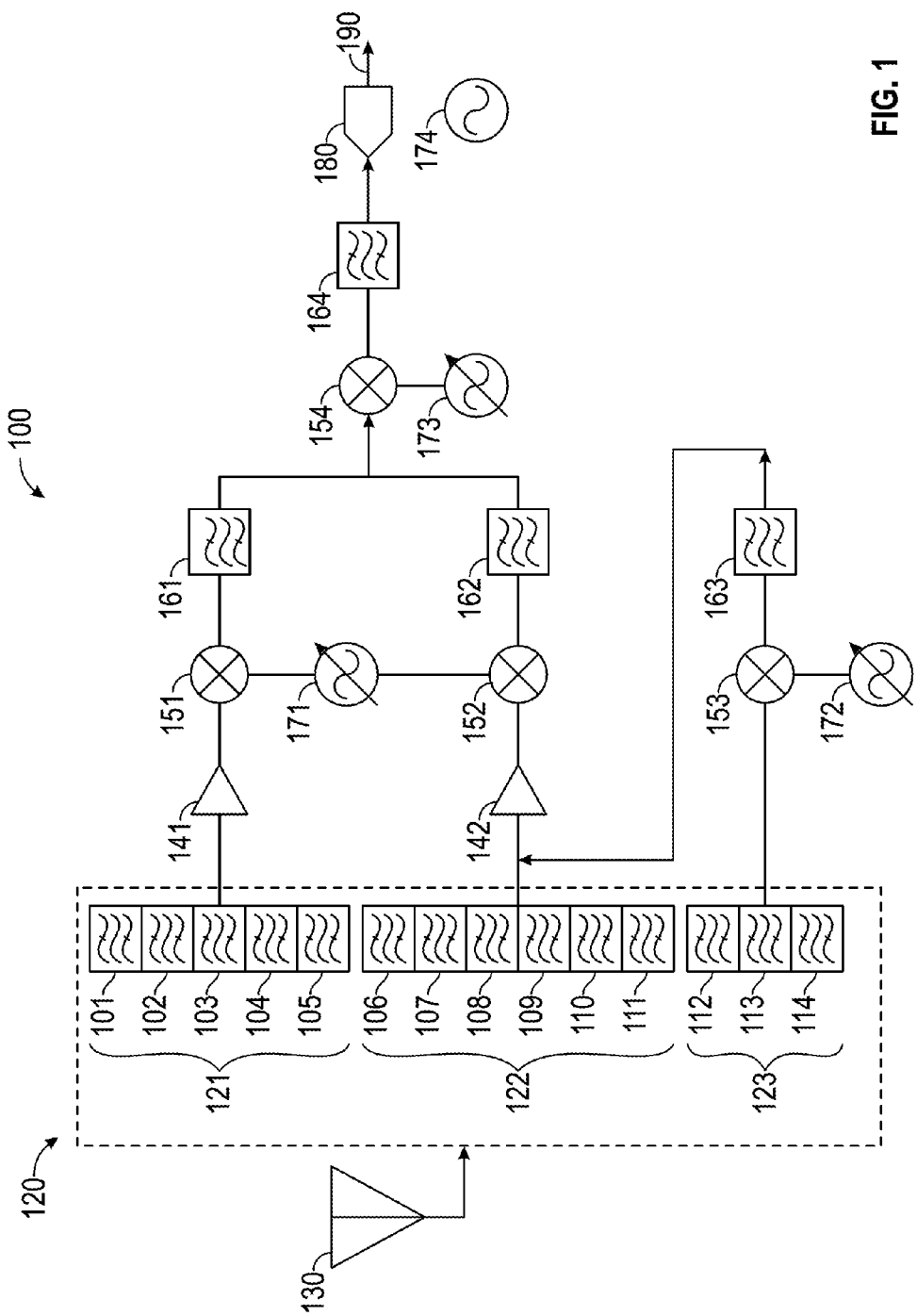
FIG. 1 is a conceptual block diagram of a superheterodyne receiver architecture in accordance with one embodiment.

Referring now to FIG. 1, a conceptual block diagram of a superheterodyne receiver architecture 100 in accordance with one embodiment will now be described. As a preliminary matter, it will be understood that the present invention is not limited to the particular topology and components shown in FIG. 1. Furthermore, the components shown in the figures may be implemented using a variety of hardware and software known in the art, such as analog and/or digital semiconductor devices, microprocessors, analog components, etc.

In general, the super-het receiver (or simply "receiver") 100 of FIG. 1 receives input from an antenna 130 and produces an output signal 190. The signal received by antenna 130 is first processed by a plurality of filters 120 that divide up the tuning range into bands in an advantageous manner, as described in further detail below. In one embodiment, for example, fourteen individual filters 101-114 are employed to divide up a tuning range of 0-40 GHz. The invention is not limited to a particular tuning range or number of filters 120, however.

Filters 120 are grouped in sets (e.g., 121, 122, and 123). In the illustrated embodiment, filter set 121 includes five filters (filters 101-105); filter set 122 includes six filters (filters 106-111); and filter set 123 includes three filters (filters 112-114). Each of the filter sets 121-123 produce individual outputs for further processing, as described below. Each of the filters 101-114 may be characterized by a center frequency and a bandwidth (e.g., its 3 dB bandwidth). In the illustrated embodiment, for example, in which the tuning range is 0-40 GHz, filters 101-114 have the following center frequencies and 3 dB bandwidths:

| Filter | Center Freq. (MHz) | Bandwidth (3 dB) |
| --- | --- | --- |
| 101 | 1250 | 2500 |
| 102 | 2750 | 1500 |
| 103 | 3750 | 1500 |
| 104 | 4750 | 1500 |
| 105 | 6250 | 2500 |
| 106 | 8250 | 2500 |
| 107 | 10250 | 2500 |
| 108 | 12250 | 2500 |
| 109 | 14250 | 2500 |
| 110 | 16250 | 2500 |
| 111 | 18500 | 3000 |
| 112 | 24000 | 8000 |
| 113 | 32000 | 8000 |
| 114 | 38000 | 4000 |

It will be understood that the above filter values are merely presented as an example, and are not intended to limit the range of embodiments.

Filters 101-114 may be implemented in a variety of ways known in the art. For example, filters 101-114 may be implemented as 9-section Chebycheff band-rejection filters, as are known in the art.

Each set 121-123 produces an individual output that is further processed as shown. Specifically, the output of filter set 121 is coupled to the input of an amplifier (or simply "amp") 141, which is then coupled to one input of a tunable mixer 151. The output of filter set 122 is coupled to the input of an amp 142, which is then coupled to one input of a tunable mixer 152. The output of filter set 123 is coupled to the input of a tunable mixer 153 (e.g., tunable from 32000 MHz to 52000 MHz), which itself is coupled to oscillator 172—for example, a synthesizer with a range of 32000-52000 MHz. The output of mixer 153 is coupled to the input of filter 163, which in the illustrated embodiment has a center frequency of 11000 and a 3 dB bandwidth of 2000 MHz. The output of filter 163 is coupled to the input of amp 142 (i.e., along with the output of filter set 122).

In the illustrated embodiment, the outputs of amps 141 and 142 are −10 dBm with respect to their respective inputs. Mixers 151 and 152 are both coupled to a single local oscillator 171. In the illustrated embodiment, local oscillator 171 operating in conjunction with mixer 151 produces a signal (e.g., a 8250 MHz to 23000 MHz signal) that is coupled to the input of filter 161, which has a center frequency of 8000 MHz with a 3 dB bandwidth of 500 MHz. Similarly, local oscillator 171 operating in conjunction with mixer 152 produces a signal coupled to the input of filter 162 that has a center frequency of 3500 MHz with a 3 dB bandwidth of 500 MHz.

The outputs of filters 161 and 162 are coupled to an input of mixer 154, which is also coupled to an oscillator 173. In the illustrated embodiment, oscillator 173 has two center frequencies. In a particular embodiment, for example, oscillator 173 has a 7000 MHz center frequency and a 4500 MHz center frequency, with an output at +7 dBm that can be tuned over the 500 MHz final frequency range of filter 164 (which has a center frequency of 1000 MHz).

The output of filter 164 is coupled to the input of an A/D converter 180, which is coupled to oscillator 174. Together, A/D converter 180 and oscillator 174 act as a digital sampling detector having as its input an inner frequency centered at 1000 MHz with a 500 MHz bandwidth to produce the desired output 190.

As mentioned above, the particular combination of components shown in FIG. 1 is particular advantageous, as it has been found that it blocks nearly all spurious noise interference that is outside the detection bandwidth at the input of receiver 100 (i.e. 0-40 GHz in the example). The use of four mixers (151, 152, 153, 154), three local oscillators (171, 172, and 173), and 14 preselector filters (101-114) as shown. Receiver 100 provides course tuning in the form of tunable mixers 151, 152, and 153. Fine tuning is provided by the use of mixer 154, which has two center frequencies, as discussed above.

Empirical testing of the example embodiment above has confirmed the unexpected results regarding immunity to spurious noise interference. Furthermore, the particular combination of components and characteristics described above are not merely design choices that would be arrived at by simple experimentation; rather, they are synergistic in that that their resulting noise immunity is far beyond what has been achieved by prior art systems with simple tuning and adjustment methods. One reason for this success, in accordance with one embodiment, is the choice of 8.0 GHz and 3.5 GHz first inner frequencies that eliminate the production of spurious noise that cross into the detection bandwidth of the final IF. The frequency plan creates, by judicious use of low-side and high-side local oscillator frequency conversions, at all frequencies outside the detection bandwidth mapped to the input of the receiver, somewhere in the physical path a filter and frequency conversion that blocks the spurious noise from reaching the digital sampling detector.

Figure 2:
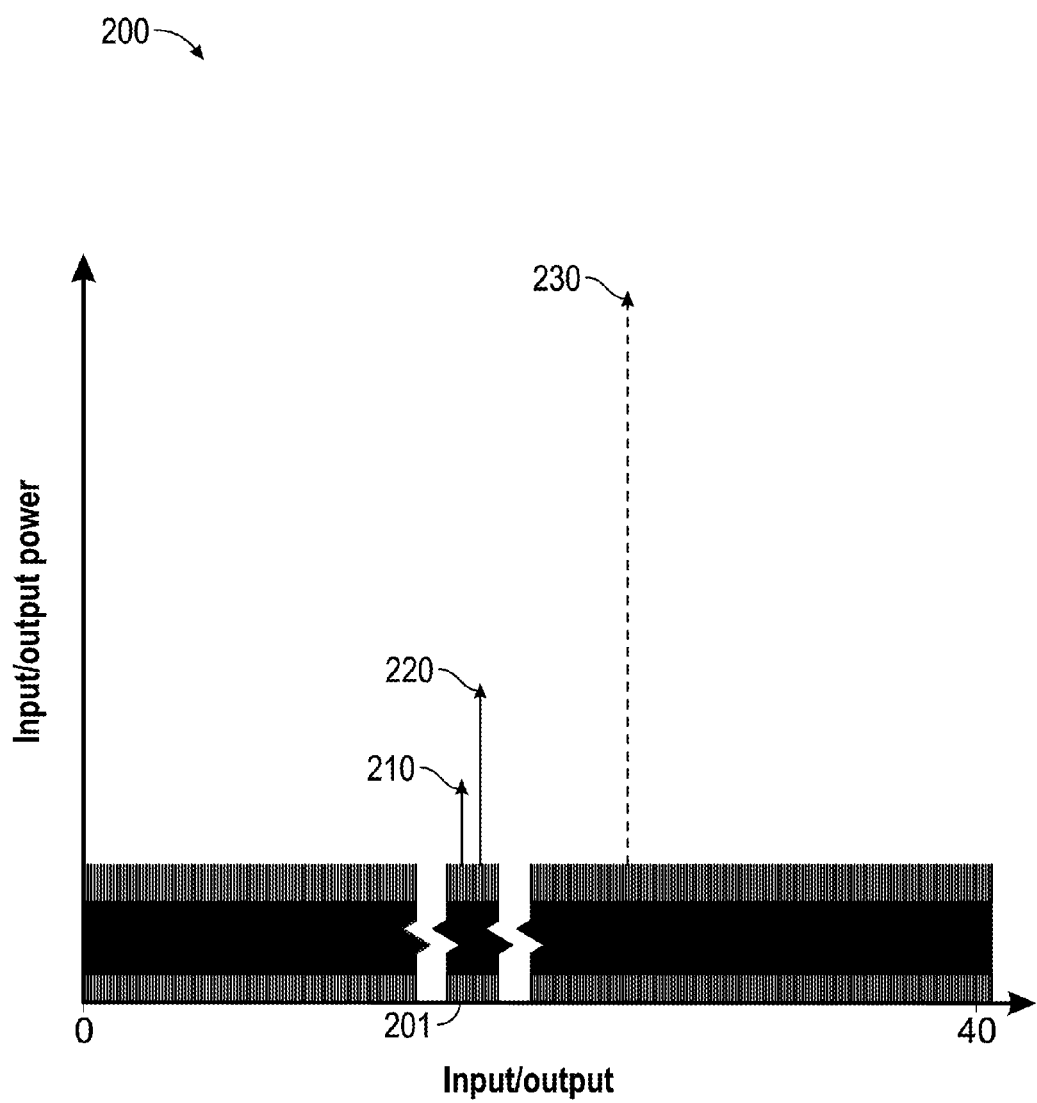
FIG. 2 is a frequency-power plot useful in describing test results related to a superheterodyne receiver in accordance with various embodiments.

FIG. 2 is a frequency-power plot useful in describing test results and principle of operation of a superheterodyne receiver 100 in accordance with various embodiments. Specifically, the horizontal axis of FIG. 2 corresponds to input/output frequency (GHz), and the vertical axis corresponds to input/output power. The horizontal axis ranges from 0 to 40 GHz (i.e., the tuning range of filters 120 shown in FIG. 1). The interference frequency range is 0 to 40 GHz, excluding the output detection zone referenced to the tuned input. The vertical axis of plot 200 is unlabeled, as the amplitudes illustrated are more qualitative than quantitative, but may correspond to any arbitrary dB level.

FIG. 2 illustrates a maximum input power (arrow 230) that corresponds to the input power required to achieve an output 10 dB ratio between the signal-of-interest (SOI) and the spurious noise. Arrows 220 and 210 illustrate spurious interference at a level that is approximately 10 dB below the SOI. The noise illustrated at the bottom of plot 200 is the output noise floor in a 1 kHz resolution bandwidth (RBW). Range 201 is the Nyquist output detection bandwidth referenced to input (not to scale).

As mentioned above, empirical testing of the example embodiment has confirmed the unexpected results regarding immunity to spurious noise interference. In that regard, a simulation was performed using a well-known circuit simulator (GENESYS) with the following settings: All of the filters were 9 or 11-section Chebycheff BRFs; Mixers 151, 152, 153, and 154 were modeled as standard double-balanced types with PLO=7 dBm; the RF input power to the mixers were set to approximately −10 dBm for mixers 151, 152, and 153; The RF input power to mixer 154 was set to −18 dBm to −27 dBm (thereby accounting for possible losses in the preceding mixers).

Using the above settings, it was found that the receiver architecture was able to substantially block all crossing spurious signals in the detection bandwidth at the output (190) due to input interference signals outside the detection bandwidth. In accordance with one estimate, out of the full 0-40 GHz tuning range, only the 2500-2750 MHz and 3825-4000 MHz bands illustrated some spurious noise. Accordingly, the immunity to spurious interference was approximately 98.75% of the tuning range, which is a substantial improvement over prior art systems.

Multiple conversion super-het receivers are commonly, at most, dual conversion systems with fixed IF frequencies designed for octave band RF tuning. The synthesis of super broadband (greater than five octave) triple conversion super-het receivers with multiple IF frequencies is rare. The rarity is due to the difficulty of optimizing the frequency plan which must be done manually by expert practitioners of super-het design, since there are no computer synthesis tools or algorithms that will perform the optimization. Currently available broadband multi-octave receivers are not immune to spurious input noise over a broad input frequency range. The best available receivers are only immune over at most 75% of their tuning range. Embodiments of the present invention are immune to outside spurious noise over 98% of its tuning range and present a significant improvement over the state-of-the-art in super-het design.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A super-heterodyne receiver comprising:
a plurality of input filters configured to receive an input signal and divide up a tuning range of the input signal into a plurality of respective bands, wherein the input filters are divided into a plurality of filter sets, each having a respective filter set output, and each of the input filters has a center frequency and a bandwidth;
a first amplifier having an input coupled to a first filter set output and an output coupled to a first mixer;
a second amplifier having an input coupled to a second filter set output and an output coupled to a second mixer;
a first local oscillator coupled to an input of the first mixer and an input of the second mixer, the local oscillator configured to produce a first oscillator signal;
a third mixer having a first input coupled to a third filter set output and a second input coupled to a second local oscillator configured to produce a second oscillator signal;
a first filter having an input coupled to an output of the first mixer, the first filter having a center frequency and a bandwidth;
a second filter having an input coupled to an output of the second mixer, the second filter having a center frequency and a bandwidth;
a third filter having an input coupled to the output of the third mixer, the third filter having a center frequency and a bandwidth, wherein an output of the third mixer is coupled to the input of the second amplifier;
a fourth mixer coupled to a third local oscillator and configured to receive the outputs of both the first and second filters, the third local oscillator configured to produce a third oscillator signal;
a fourth filter having an input coupled to the fourth mixer, the fourth filter having a center frequency and a bandwidth; and
a digital sampling detector having an input coupled to an output of the fourth filter and configured to produce a receiver output.

2. The super-heterodyne receiver of claim 1, wherein at least a portion of the filters are implemented as Chebycheff band-rejection filters.

3. The super-heterodyne receiver of claim 2, wherein at least a portion of the filters are implemented as 9-section Chebycheff band-rejection filters.

4. The super-heterodyne receiver of claim 1, wherein the first, second, and third mixers provide course tuning, and the fourth mixer provides fine tuning for the receiver.

5. The super-heterodyne receiver of claim 1, wherein the first filter has a center frequency of approximately 8.0 GHz, the second filter has a center frequency of 3.5 GHz, and the first oscillator signal is tunable from 8250 MHz to 23000 MHz.

6. The super-heterodyne receiver of claim 1, wherein plurality of input filters comprises 14 input filters having approximately the following respective center frequencies and bandwidths, wherein filters 1-5 compose the first filter set, filters 6-11 compose the second filter set, and filters 12-14 compose the third filter set:

| Input Filter | Center Freq. (MHz) | Bandwidth (3 dB) |
|---|---|---|
| 1 | 1250 | 2500 |
| 2 | 2750 | 1500 |
| 3 | 3750 | 1500 |
| 4 | 4750 | 1500 |
| 5 | 6250 | 2500 |
| 6 | 8250 | 2500 |
| 7 | 10250 | 2500 |
| 8 | 12250 | 2500 |
| 9 | 14250 | 2500 |
| 10 | 16250 | 2500 |
| 11 | 18500 | 3000 |
| 12 | 24000 | 8000 |
| 13 | 32000 | 8000 |
| 14 | 38000 | 4000 |

7. The super-heterodyne receiver of claim 1, wherein the digital sampling detector comprises an analog-to-digital converter coupled to a fourth oscillator, the inner frequency centered at 1000 MHz and having a 500 MHz bandwidth.

8. The super-heterodyne receiver of claim 1, wherein the third oscillator has a first selectable center frequency of 7000 MHz and second selectable center frequency of 4500 MHz.

9. The super-heterodyne receiver of claim 8, wherein the fourth filter has a center frequency of 1000 MHz and a bandwidth of 500 MHz.

10. The super-heterodyne receiver of claim 1, wherein the first filter has a center frequency of about 8000 MHz, the second filter has a center frequency of about 3500 MHz, and the third filter has a center frequency of about 11000 MHz.

11. The super-heterodyne receiver of claim 1, wherein the second oscillator is tunable from about 32000 MHz to 52000 MHz.

12. A super-heterodyne receiver comprising:
a plurality of input filters configured to receive an input signal and divide up a tuning range of the input signal into a plurality of respective bands, wherein the input filters are divided into a plurality of filter sets, each having a respective filter set output, and each of the input filters has a center frequency and a bandwidth;
a first amplifier having an input coupled to a first filter set output and an output coupled to a first mixer;
a second amplifier having an input coupled to a second filter set output and an output coupled to a second mixer;
a first local oscillator coupled to an input of the first mixer and an input of the second mixer, the local oscillator configured to produce a first oscillator signal;
a third mixer having a first input coupled to a third filter set output and a second input coupled to a second local oscillator configured to produce a second oscillator signal;
a first filter having an input coupled to an output of the first mixer, the first filter having a center frequency and a bandwidth;
a second filter having an input coupled to an output of the second mixer, the second filter having a center frequency and a bandwidth;
a third filter having an input coupled to the output of the third mixer, the third filter having a center frequency and a bandwidth, wherein an output of the third mixer is coupled to the input of the second amplifier;
a fourth mixer coupled to a third local oscillator and configured to receive the outputs of both the first and second filters, the third local oscillator configured to produce a third oscillator signal;

a fourth filter having an input coupled to the fourth mixer, the fourth filter having a center frequency and a bandwidth; and a digital sampling detector having an input coupled to an output of the fourth filter and configured to produce a receiver output;

wherein the first filter set comprises a first plurality of input filters having respective center frequencies ranging from approximately 1250 MHz to 6250 MHz, a second plurality of input filters having respective center frequencies ranging from approximately 8250 MHz to 18500 MHz, and a third plurality of center frequencies ranging from approximately 24000 MHz to 38000 MHz;

wherein the first filter has a center frequency of approximately 8000 MHz, the second filter has a center frequency of approximately 3500 MHz, and the first oscillator is adjustable between approximately 8250 MHz and 23000 MHz.

13. The super-heterodyne receiver of claim 12, wherein at least a portion of the filters are implemented as Chebycheff band-rejection filters.

14. The super-heterodyne receiver of claim 13, wherein at least a portion of the filters are implemented as 9-section Chebycheff band-rejection filters.

15. The super-heterodyne receiver of claim 12, wherein the first, second, and third mixers provide course tuning, and the fourth mixer provides fine tuning for the receiver.

16. The super-heterodyne receiver of claim 12, wherein the digital sampling detector comprises an analog-to-digital converter coupled to a fourth oscillator, the inner frequency centered at 1000 MHz and having a 500 MHz bandwidth.

17. The super-heterodyne receiver of claim 12, wherein the third oscillator has a first selectable center frequency of 7000 MHz and second selectable center frequency of 4500 MHz.

18. The super-heterodyne receiver of claim 17, wherein the fourth filter has a center frequency of 1000 MHz and a bandwidth of 500 MHz.

19. The super-heterodyne receiver of claim 12, wherein the receiver output is immune to spurious interference over approximately 98-99% of the tuning range.

20. The super-heterodyne receiver of claim 12, wherein the tuning range is approximately 0-40 GHz.

* * * * *